United States Patent Office 3,312,528
Patented Apr. 4, 1967

3,312,528
DETERMINATION OF CYANIDES
Paul W. McConnaughey, Pittsburgh, Pa., assignor to Mine Safety Appliances Company, Pittsburgh, Pa., a corporation of Pennsylvania
No Drawing. Filed Aug. 18, 1964, Ser. No. 392,072
9 Claims. (Cl. 23—254)

This invention relates to the determination, both qualitative and quantitative, of hydrogen cyanide (HCN) in air or other gases.

It is known that hydrogen cyanide causes a color reaction when passed into contact with an aqueous solution of o-tolidine (4-4' amino, 3-3' methyl diphenyl) and copper sulfate ($CuSO_4$). However, experience has shown that such a reagent suffers from instability, i.e., its shelf life is short so that fresh reagent is needed, otherwise false indications are given. In my Patent No. 2,728,639, I disclosed a modified reagent that was stable for at least about seven months in which o-tolidine and copper sulfate or copper acetate are supplied in a glycerine solution, and a device in which the reagent is carried on a granular inert carrier disposed in a sealed transparent tube. Because of normal distributional delays in commercial channels such as may result from maintaining adequate stocks by manufacturers and distributors, it is desirable to have indicator devices for the said cyanides that have a longer shelf life.

It is therefore an object of this invention to provide a colorimetric indicator device for determining hydrogen cyanide that affords excellent sensitivity and improved shelf life, or aging characteristics. Other objects will be apparent from the following description and claims.

This invention is based on my discovery that a reagent responding to hydrogen cyanide containing o-tolidine, copper sulfate or copper acetate, an organic acetate and water, kept from contact with air or other oxidizing atmosphere, has exceptional stability or storage life.

In accordance with this invention, the aforesaid reagent is carried by or impregnated into an inert material such as filter paper or a granular material such as sand, silica gel, and similar materials of like nature, of which a variety are known and commercially available. The impregnated carrier is then disposed in an openable sealed container that is freed of air, as by evacuation or displacement by an inert gas, such as, for example, nitrogen or argon. When it is desired to use the indicator, the container is opened and the indicator promptly undergoes a distinct change to a blue color upon being contacted with hydrogen cyanide.

Although the proportions of the constituents of the indicator may be varied, for most purposes it is preferred to use proportions of about 0.070 to 0.090 g. of o-tolidine, about 0.35 to 0.45 g. of copper sulfate or copper acetate, about 17 to 23 g. of water, and about 17 to 25 g. of organic acetate to about 200 g. of inert carrier, such as silica gel.

In the preferred embodiment of this invention proportions are 0.08 g. of o-tolidine, 0.40 g. of copper sulfate or copper acetate, 21 g. of organic acetate and 20 g. of water per 200 g. of carrier, such as silica gel.

The presence of an organic acetate in the reagent is essential to its exceptional storage stability. Generally any acetic acid ester of a saturated unsubstituted carbinol, an alkyl substituted phenol or an alkyl substituted naphthol is suitable for use in this invention. The term saturated unsubstituted carbinol includes any carbinol in which the hydrocarbon radical or radicals, substituted in place of a carbon-bonded hydrogen in methanol, are saturated and contain no elements other than carbon and hydrogen. Illustrative of such suitable acetates are the acetic acid esters of methylcarbinol (ethyl alcohol), dimethylcarbinol (isopropyl alcohol), methylphenylcarbinol (α-methyl benzyl alcohol) methylpropylcarbinol, ethylcarbinol (propyl alcohol), ethylmethylcarbinol (sec-butyl alcohol), ethylphenylcarbinol, ethylpropylcarbinol, propylcarbinol (n-butyl alcohol), butylcarbinol, sec-butyl carbinol, tert-butylcarbinol, butyldimethylcarbinol, isobutylcarbinol (isoamyl alcohol), dibutylcarbinol, diisoamylcarbinol, dimethylphenylcarbinol, diphenylcarbinol (benzohydrol) phenylcarbinol (benzyl alcohol) 1-naphthyldiphenylcarbinol, o-tolylcarbinol (o-methylbenzyl alcohol) m-tolylcarbinol, p-tolylcarbinol (o-methyl benzyl alcohol) m-tolyl carbinol, p-tolyl carbinol, benzylphenylcarbinol, cetyl alcohol, cumic alcohol, carvacral, thymol, methylphenol, dimethylphenol, trimethylphenol, o-ethylphenol, p-ethylphenol, m-ethylphenol, p-amylphenol p-tert-amylphenol, o-butylphenol, p-isoamylphenol, o-isopropylphenol, and 1-methyl-2-naphthol. Indicators of this invention containing such acetates may be stored in the absence of an oxidizing atmosphere for a year or more at ambient temperature with no adverse effect. Preferred reagents containing iso-amyl acetate or benzyl acetate have a storage life of at least about two years.

An important feature of the invention resides in the sensitivity of the reagent; the preferred composition stated will detect 0.5 p.p.m. of HCN in air using a 100 ml. sample of air.

The inert carriers may be impregnated with a solution of all the reagent constituents, or by multiple impregnations of separate reagent constituents. For example, silica gel may be sequentially impregnated with a copper sulfate solution and then dried, impregnated with an o-tolidine solution of organic acetate and then impregnated with water.

Although the indicator may be contained in any openable sealed container, such as a plastic envelope, it is preferred to dispose an elongate bed of granular indicator in a small cross-sectional sealed tube of glass or other transparent material which can be used in the general manner described in Patent No. 2,174,349 to John B. Littlefield. When a determination is to be made the sealed ends are opened and the air or other gas to be tested is flowed through the tube by any suitable means. In the presence of cyanides of the class stated the reagent promptly reacts with development of the characteristic color. In addition to being useful for detecting qualitatively the presence of these cyanides, the invention is applicable also to their quantitative determination. To this end a measured volume of the air or other gas to be tested is passed through a tube as just described, and the length over which the color change occurs affords a direct measure of the cyanide concentration. For this purpose the measured volume of air may be supplied in various ways, as by means of an aspirator bulb of known volumetric delivery. By comparing the length over which the color change occurs with a scale calibrated by the use of different known cyanide concentrations, there is thus a direct determination. The color change produced is permanent so that the tubes serve for record purposes, if desired.

According to the provision of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. A device for testing a gas for hydrogen cyanide comprising an elongate small cross-sectional area bed of inert granular material carrying a reagent comprising o-tolidine, a salt of the group consisting of copper sulfate and copper acetate, an acetic acid ester of an alcohol selected from the group consisting of saturated unsubstituted carbinols, alkyl substituted phenols and alkyl substituted naphthol, and water disposed in a sealed transparent tube substantially free of oxidizing atmosphere.

2. A device according to claim 1, said ester being isoamyl acetate.

3. A device according to claim 1, said ester being benzyl acetate.

4. A device for testing a gas for hydrogen cyanide comprising an elongate small cross-sectional area sealed tube of transparent material substantially free of oxidizing atmosphere and containing inert granular material carrying a reagent comprising o-tolidine, a salt of the group consisting of copper sulfate and copper acetate, an acetic acid ester of an alcohol selected from the group consisting of saturated unsubstituted carbinols, alkyl substituted phenols and alkyl substituted naphthol, and water in the proportions of about 0.070 to 0.090 g. of o-tolidine, about 0.35 to 0.45 g. of salt, about 17 to 25 g. of acetate, and about 17 to 23 g. of water, to 200 g. of said carrier.

5. A device according to claim 4, said proportions being .08 g. of o-tolidine, 0.04 g. of salt, 21 g. of acetate, and 20 g. of water.

6. A device according to claim 4, said ester being isoamyl acetate.

7. A device according to claim 4, said ester being benzyl acetate.

8. A device according to claim 4, said carrier being silica gel.

9. A device for testing a gas for hydrogen cyanide comprising an openable sealed container substantially free of oxidizing atmosphere and containing an inert carrier impregnated with a reagent comprising o-tolidine, a salt of the group consisting of copper sulfate and copper acetate, an acetic acid ester of an alcohol selected from the group consisting of saturated unsubstituted carbinols, alkyl substituted phenols and alkyl substituted naphthol, and water disposed in a sealed transparent tube substantially free of oxidizing atmosphere.

References Cited by the Examiner
UNITED STATES PATENTS
2,534,229   12/1950   Carhart et al. _____ 23—232

MORRIS O. WOLK, *Primary Examiner.*

L. MEI, *Assistant Examiner.*